Patented Feb. 14, 1939

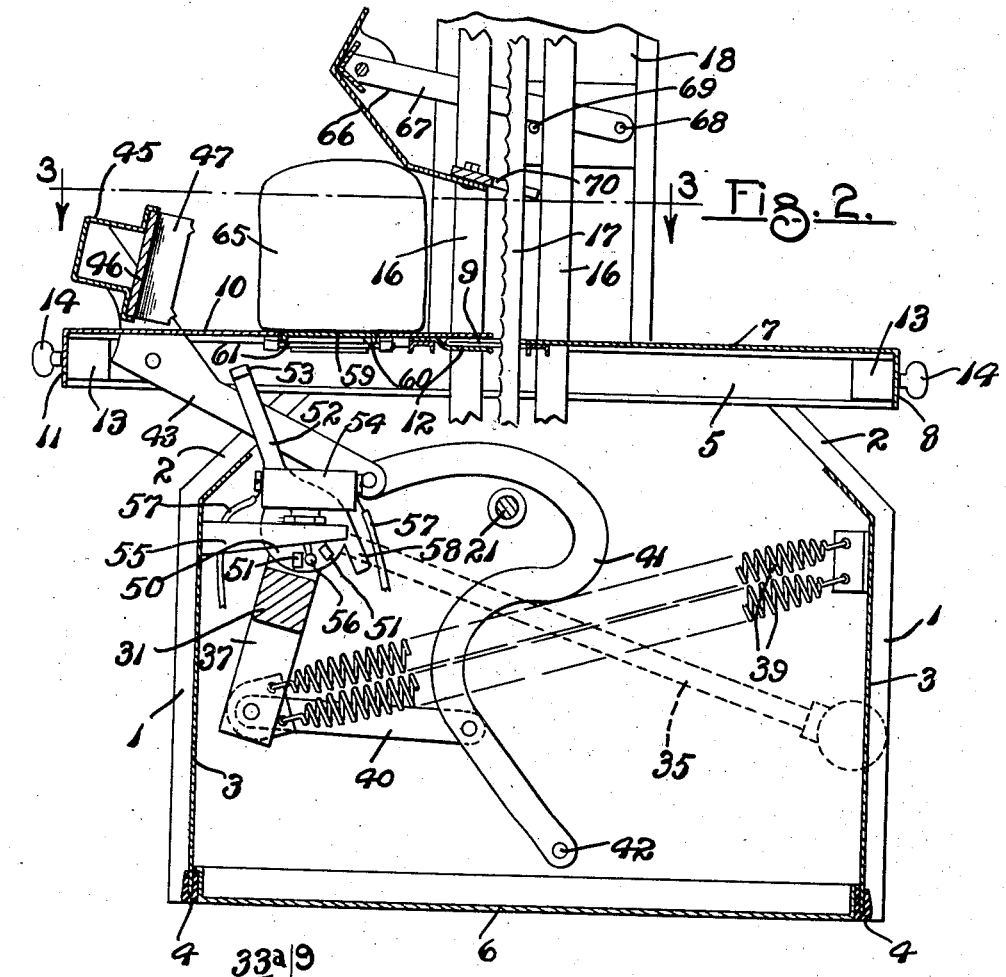

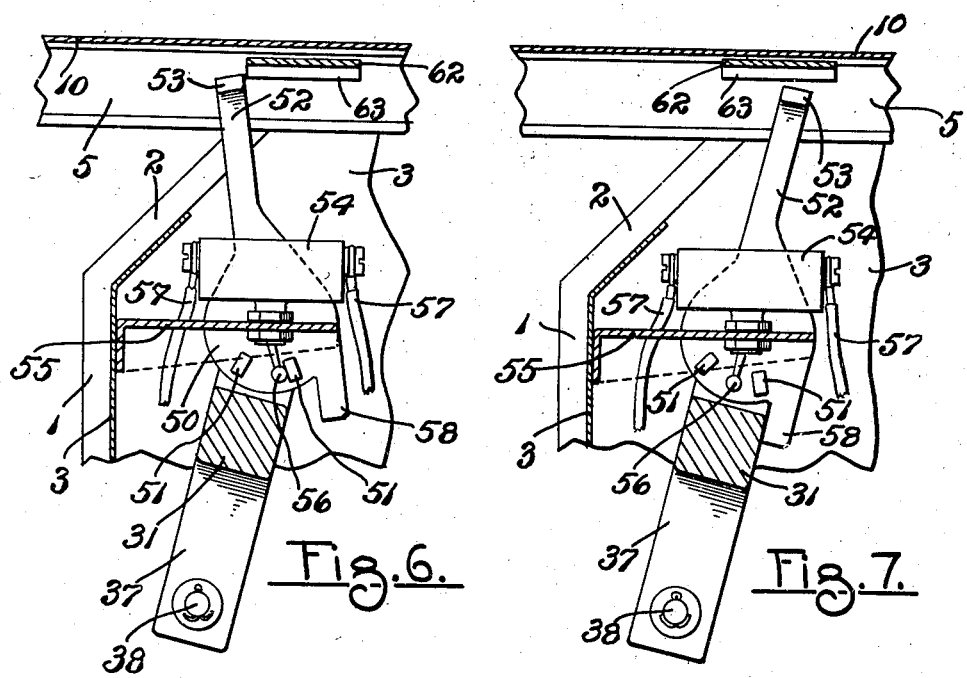
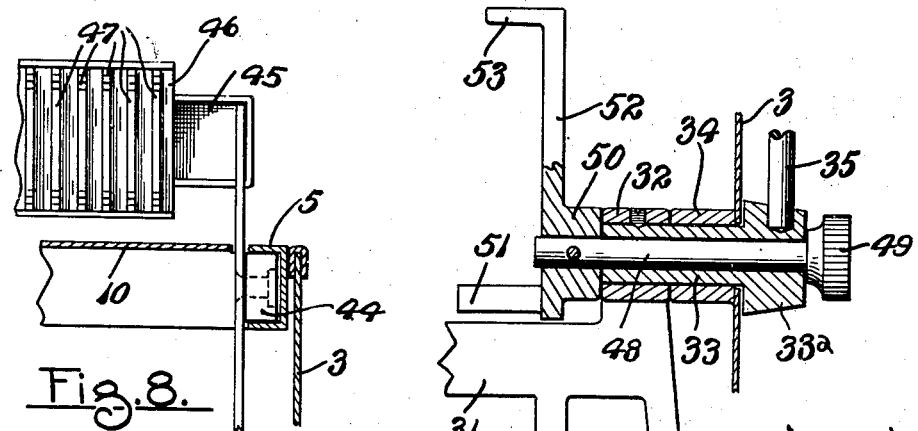

2,147,322

UNITED STATES PATENT OFFICE 2,147,322

SAFETY CONTROL FOR BREAD SLICING MACHINES

Howard B. Tuthill and Harry F. Caldwell, Grand Rapids, Mich., assignors to Oliver Machinery Company, Grand Rapids, Mich., a corporation of Michigan Application July 20, 1936, Serial No. 91,496

13 Claims. (Cl. 146—153)

This invention relates to bread slicing machines in which the bread is pushed against and past slicing blades or knives by means of a pusher. The invention relates more particularly to a novel means for operating and controlling the pusher and safety means which prevents the operator of the machine getting his fingers against the knives while they are in operation.

The safety mechanism generally includes means to prevent operation of the knives unless a loaf of bread is in place in front of them in position to prevent the operator's fingers being inserted in the machine and also means requiring the use of both hands of the operator in a position remote from the knives to start the operation thereof.

The invention provides various novel features of construction and arrangement hereinafter more fully described and particularly pointed out in the claims, reference being had to the accompanying drawings, in which Fig. 1 is a vertical section through the machine between its ends showing the pushing member in one extreme position of its movement or when it has pushed a loaf of bread past the slicing knives.

Fig. 2 is a similar section illustrating the pusher at the opposite extreme of its movement and with a loaf of bread located between the same and the slicing knives.

Fig. 3 is a fragmentary horizontal section substantially on the plane of line 3—3 of Fig. 2.

Fig. 6 is a fragmentary vertical section substantially on the plane of line 6—6 of Fig. 4.

Fig. 7 is a similar section but showing the parts in another position.

Fig. 8 is a fragmentary section and elevation illustrating the mounting of the pusher, and Fig. 9 is a fragmentary section substantially on the plane of line 9—9 of Fig. 3.

Like reference characters refer to like parts in the different figures of the drawings, and the section lines are taken as looking in the directions indicated by the arrows.

Figure 1:
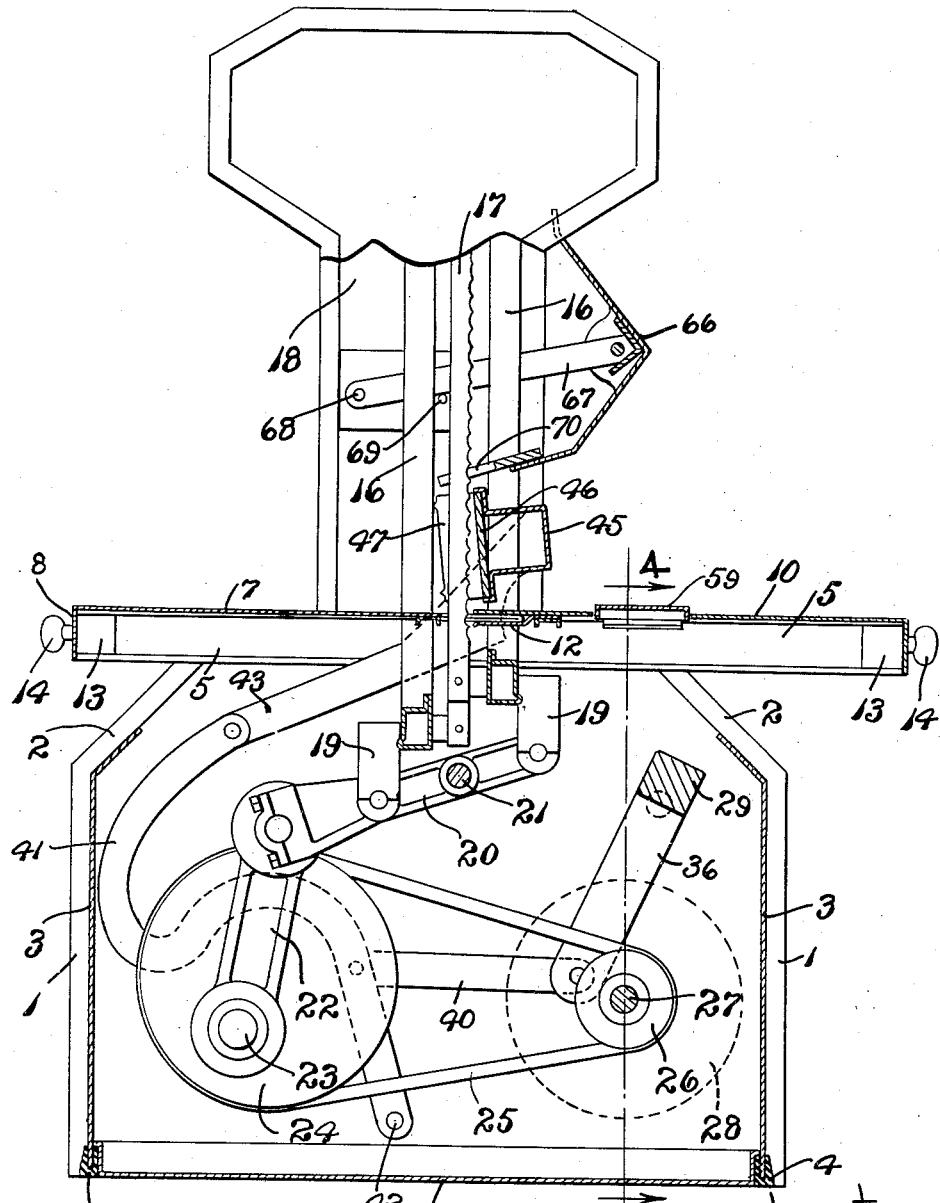

In the construction of the machine, supporting posts 1 are provided the upper ends of which preferably are bent inwardly and upwardly as indicated at 2, and the sides and ends of the frame are enclosed by means of side and end plates 3 of sheet metal which, preferably, at their lower ends are provided with rubber foot members 4.

At the upper ends of the inturned sections 2 of the posts two horizontally positioned channel guides 5 spaced from each other are secured by welding, riveting or other suitable permanent connection. A pan 6 is located at the lower side of the housing structure provided by the posts 1 and the enclosing sides and ends 3 and is in the form of a tray whereby it may be conveniently used to catch crumbs which may be produced in the operation of the machine.

A delivery table and a feed table are carried on and between the spaced apart channels 5. The delivery table has an upper horizontal side 7 with a downturned flange 8 at its outer edge. At its inner edge it is slotted with a plurality of closely positioned spaced apart slots 9 for the passage of the slicing knives therethrough (Fig. 3). The feed table likewise has an upper horizontal section 10 with a downturned flange 11 at its outer end and with an embracing clip section 12 attached to its lower side adjacent its inner edge, the adjacent inner edge of the table 7 being received between the underside of the table section 10 and said clip, as shown in Fig. 2, the feed table and the delivery table meeting near the longitudinal middle of the machine. Bars 13 extend across between the ends of the channel guides 5 and are secured thereto and thumb bolts 14 passing through the flanges 8 and 11 are threaded into said bars for thus detachably securing the feeding and delivery tables in place.

Near their meeting edges and at the ends of the feeding and delivery tables 10 and 7 they are cut away to make openings 15 (Fig. 3), for the passage of the vertical members of blade carrying frames 16. There are two of these frames vertically positioned, each carrying slicing blades 17 in a manner common to bread slicing machines. The blades and frames extend above the tables and are housed within a suitable frame and housing structure 18, the detail of which is irrelevant to the present invention.

Each frame 16 at its lower side has connecting members 19 which are pivotally connected to rocking arms 20 which are mounted upon a rock shaft 21, one near each side of the machine, the connections of the members 19 to the rocking arms 20 being at opposite sides and equal distances from the rock shaft 21, whereby when the arms 20 are oscillated the two frames 16 and the knives carried thereby are reciprocated simultaneously in opposite directions.

One of the rocking arms 20 is connected by a link 22 to a stud 23 extending from a rotatably mounted disk 24, the stud 23 being mounted eccentrically on the disk so that rotation of the disk results in rocking the arms 20 and the shaft 21. The disk 24 is driven by a belt 25 from a drive pulley 26 mounted on the shaft 27 of an electric motor 28.

A bar 29 is pivotally mounted in a suitable bearing 30 at one end (Fig. 4) and extends across and between the sides 3 of the housing. Near its opposite end it is offset and continued as at 31 and is provided with a sleeve bearing 32 (Figs. 4 and 9) which is located around and secured to a short hollow shaft 33. The shaft 33 extends through the adjacent side 3 and through a bearing 34, and has a head 33a to which a hand lever 35 is secured and by means of which the bar 31 may be turned about an axis extending through the bearings 30 and 34.

Figure 4:
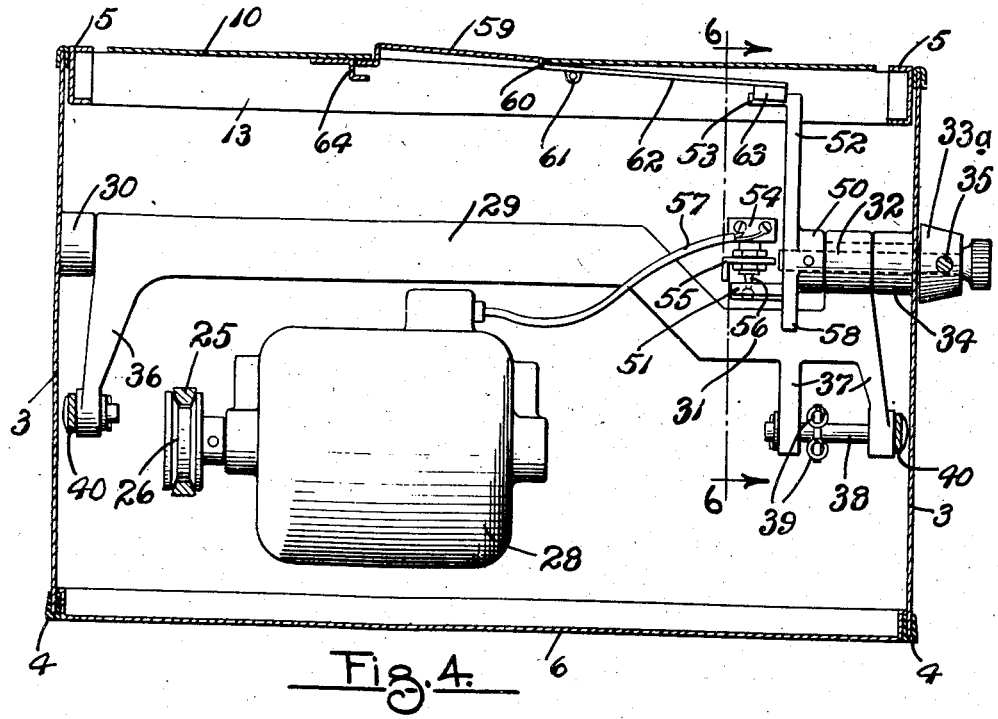
Fig. 4 is a vertical section substantially on the plane of line 4—4 of Fig. 1.
Figure 5:
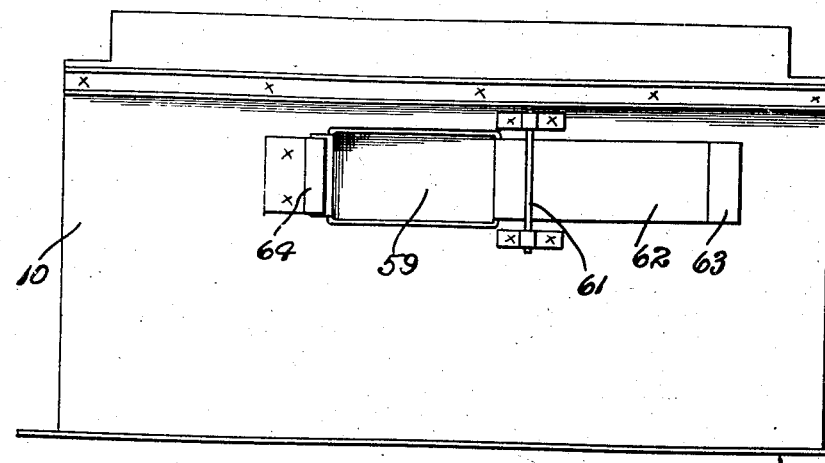
Fig. 5 is an underplan view of the feeding table upon which the loaves of bread are successively placed.

Adjacent the end of the bar 29 an arm 36 extends downwardly (Fig. 4). Adjacent the end of the offset section 31 two spaced apart arms 37 extend downwardly between which a rod 38 is located. Coiled springs 39 are attached at one end to the rod 38 and at their opposite ends to an adjacent side 3 of the housing (Fig. 2). These springs normally move the bar 29 to the position shown in Fig. 1, but by operating the hand lever 35, the parts are moved to the position shown in Fig. 2.

Links 40 are connected at one end to the lower ends of the arm 36 and the outermost arm 37 (Fig. 4) and at their opposite ends are connected to irregularly shaped levers 41 which are pivotally mounted at 42 at their lower ends and at their upper portions are curved in gooseneck form for non-interference with the rock shaft 21. Arms 43 are pivotally connected at their lower ends to the upper ends of the levers 41 and extend upwardly through suitable slots cut in the feed table 10 and are located immediately within the channel guide 5.

A block 44 (Figs. 3 and 8) is connected to each of the bars 43 and traverses the channel guides 5 which serve as tracks for the blocks. A sheet metal housing 45 connects the upper ends of the arms 43 above the feed table 10 and at its inner face carries a plate 46 from which a plurality of spaced apart fingers 47 project, the fingers being spaced so as to pass between the slicing blades 17 when moved to the position shown in Fig. 1.

The construction described is a manually operated pusher, which, under the influence of the springs 39, will normally occupy the position shown in Fig. 1. On operation of the hand lever 35, the pusher is moved outwardly to the position shown in Fig. 2 so that a loaf of bread may be located on the feed table between the pusher and the slicing blades. The movement of the pusher with the structure described results in the pusher fingers 47 and the plate 46 to which they are attached being turned slightly upward about the pivots of the blocks 44 during the initial movement of the pusher toward the blades and later, or after the fingers 47 have engaged the loaf of bread, they are turned slightly in a downward direction and continue to be so turned during the time that the loaf of bread is being operated upon by the slicing blades whereby the loaf is pressed downwardly against the table over which it passes and is held against being moved upwardly by any movement of the slicing blades.

A shaft 48 equipped at its outer end with a knurled knob 49 (Fig. 9) passes through and is rotatably mounted in the hollow sleeve shaft 33. At its inner end a switch operating element is secured comprising a disk 50 from the lower portion of which two spaced fingers 51 extend horizontally. An arm 52 extends upwardly from the disk 50 and terminates in a laterally turned finger 53. The finger 53 extends upwardly into the horizontal plane of the channel guides 5 (Figs. 2, 6 and 7). An electric switch 54 is carried by suitable brackets 55 adjacent the disk 50 and has an operating lever 56 extending downwardly therefrom which lies between the two fingers 51 (Figs. 2, 6 and 7). The switch is of the well known snap variety such that the operating lever 56 must be moved a distance whereupon the switch will snap either open or closed, dependent upon the direction of movement of the lever 56. This switch 54 is in the electric circuit to the motor 28 of which the conductors 57 form a part and it acts to open or close the motor circuit. From the disk 50 a finger 58 extends downwardly and is in the path of movement of the offset portion 31 of the bar 29 (Fig. 7).

The feed table 10 has an opening through which one section 59 of a pivotally mounted plate normally extends (Fig. 4). The pivotally mounted plate is offset adjacent one end of the opening at 60, is pivotally mounted at 61 at the underside of the feed table 10, and extends therefrom as a section 62 having, at its free end and at its underside, a block 63 permanently secured which lies in the path of movement of the arm 53 previously described. The weight of the block holds the parts in the position shown in Fig. 4 until a loaf of bread is placed upon the projecting section 59. The free end of the section 59 is offset downwardly and extends underneath the feed table 10 and may move between the underside of said feed table and a Z-shaped stop 64 as shown in Fig. 4. When a loaf of bread is placed upon the projecting portion 59 the block 63 is elevated out of the path of movement of the arm 53 as in Fig. 7. Before the loaf of bread is placed upon the part 59 the block 63 is in the path of movement of the arm 53 as shown in Fig. 6.

In operation of the machine the operator moves the hand lever 35 with one hand to position the pusher as shown in Fig. 2 and holds it there against action of the springs 39. Upon this movement the offset portion 31 of bar 29 moves away from the finger 58 and frees the switch operating mechanism. A loaf of bread is then placed upon the feed table 10 by the other hand of the operator over the projecting part 59 thereby moving the block 63 upwardly out of the path of the finger 53. The operator then, with the hand which has been used to place the loaf turns the knob 49 to close the switch 54 and start the motor in operation. Then by releasing the hand lever 35, which should be done under control of the operator, the pusher moves the loaf of bread to and past the slicing knives and in such movement the finger 58 (Fig. 7) being engaged by the part 31 returns the switch operating mechanism to its original position and the switch is snapped off to stop the motor immediately after the bread has passed beyond the slicing knives and the pusher reaches the position shown in Fig. 1. Succeeding operations duplicate what has been described.

It is evident that the switch cannot be operated when the projecting portion 59 of the pivotally mounted plate is not depressed by a loaf of bread. It is further evident that the switch cannot be operated to start the electric motor until the pusher has been moved back to substantially the position shown in Fig. 2 and that the operator must use one hand to hold the hand lever in this position against action of the springs 39 while the other hand is used to turn the knob 49 to operate the switch.

Therefore, the slicing knives cannot be caused to operate until a loaf has been placed in front of them which loaf guards them against contact by the fingers of the operator and furthermore both hands of the operator must be in use to close the switch to start the motor and the knives. The final movement of the pusher and its operating mechanism automatically moves the switch to open position to stop the motor which cannot be again started excepting by moving the parts as heretofore described and by placing a loaf in a position to prevent inadvertent contact with the knives by either hand of the operator and by use of both hands of the operator in positions remote from the knives.

The loaf of bread 65 when passing to the slicing knives passes underneath a plate 66 (Figs. 1 and 2) pivotally mounted at the end of arms 67 which, at their opposite ends, are pivotally mounted at 68 on the slicing blade housing. The arms are limited in their downward movement by stops 69. A comb guide 70 is secured at one edge portion of the blade 66 the fingers thereof passing between the slicing blades 17. The loaf first engages with the plate 66 and turns it upwardly and may lift the plate 66 and the arms 67 as it passes underneath the blade stabilizing comb guide 70.

The invention is defined in the appended claims and is to be considered comprehensive of all forms of structure coming within their scope.

We claim:

1. In a bread slicing machine having a table, slicing knives passing through the table and means for reciprocating said knives, of a pusher for bread manually operable away from said knives and spring actuated toward said knives, an electric motor for reciprocating the knives, an electric circuit in which said motor is located, a switch for opening and closing the circuit, manually operable means for turning said switch to closed position, and means mounted on the table for preventing closure of the switch, said means being made ineffective by placing a loaf of bread thereon.

2. In a bread slicing machine, a table, slicing knives passing through the table, an electric motor, means driven by the electric motor for reciprocating the knives, a pusher having a part movable over the table to push a loaf of bread to and past the knives, manually operable means for withdrawing the pusher from the knives, release of which means permits the pusher to move toward the knives, an electric circuit in which the motor is included, switch in the circuit, manually operable means for closing the switch, means preventing closure of the switch except when the pusher is moved a predetermined distance away from the knives, and means mounted on the table normally preventing closure of the switch, said means being located between the outermost position of the pusher and said slicing knives and said means being rendered ineffective by the weight of a loaf of bread placed thereon, as specified.

3. In a machine of the class described, a table, slicing knives passing through the table, means for reciprocating the slicing knives, a bar mounted for rocking movements, spring means normally rocking the bar in one direction, a pusher comprising a loaf engaging member located across and above the table, arms extending from the ends of said loaf engaging member, means for mounting the arms to traverse the table toward and away from the slicing knives, levers pivotally connected at one end to said arms and having a pivotal mounting at their other ends, second arms extending from the rocking bar, links between said second arms and the said levers, and means for manually rocking said rocking bar in a direction opposite to the movement imparted by said springs.

4. A construction containing the elements in combination defined in claim 3 combined with an electric motor, means operated by the motor for reciprocating said slicing knives, an electric circuit for the motor, a switch in said circuit, means for manually closing said switch, and means on said manually operated switch closing means adapted to engage against said rocking bar in one position to prevent closing the switch until the bar has been manually rocked and said pusher has been moved a predetermined distance away from the slicing knives.

5. A construction containing the elements in combination defined in claim 3, combined with an electric motor, means driven by said electric motor and connected with the slicing knives to reciprocate the same, an electric circuit for said motor, a switch in said circuit, manually operable means for opening the switch, a plate mounted on said table having one end portion above the table, the other end portion below the table, a stop on the latter end portion, means on said manually operable switch opening means having a path of movement to engage said stop when the plate is in normal position thereby preventing operation of the switch, the projecting portion of said plate being depressed and the stop lifted to inoperative position upon placing a loaf of bread on the table over said projecting portion of the plate.

6. In a bread slicing machine having a table over which bread is moved and slicing knives for slicing the bread, means for reciprocating said slicing knives, a pusher to move a loaf of bread to and past the slicing knives, means for manually controlling the pusher whereby the same may be moved away from the knives and permitted to move toward said knives, means for rendering reciprocation of the slicing knives ineffective except when the pusher is a predetermined distance from the knives, and additional means for rendering reciprocation of the knives ineffective except when a loaf of bread is located in a predetermined position on the table between the pusher and the knives.

7. A construction containing the elements in combination defined in claim 6 combined with means operated by the pusher when it has moved a loaf of bread to and past said slicing knives for stopping reciprocation of said slicing knives.

8. In a bread slicing machine, a horizontal table, channel guides located underneath the table in spaced apart relation to each other and adjacent opposite ends thereof, bars extending through the table, means on the bars traversing said channel guides, a loaf engaging pusher carried between the upper ends of said bars over the table, levers pivotally mounted at their lower ends having pivotal connection at their upper ends to said bars, manually operable means connected with said levers for moving the same in a direction to move the pusher away from the slicing knives, said manually operable means when moved in the opposite direction moving the pusher toward said slicing knives, as specified.

9. A construction containing the elements in combination defined in claim 8, combined with an electric motor, means connected with the slicing knives and driven by said electric motor for reciprocating the knives, an electric circuit for the motor, an opening and closing switch for controlling the stopping and starting of the motor, manually operable means for closing the switch and means preventing operation of said manually operable means except when the pusher has been moved a predetermined distance away from the slicing knives.

10. A construction containing the elements in combination defined in claim 8, combined with an electric motor, means driven thereby and connected with the slicing knives for reciprocating said knives, an electric circuit for the motor, an opening and closing switch in said circuit, manually operable means for closing the switch, means mounted on the table, and cooperating means on said manually operable switch closing means normally preventing closure of the switch until said means on the table has been operated as by the weight of a loaf of bread applied thereto, as specified.

11. In a bread slicing machine, a table, slicing knives passing therethrough, an electric motor, means connected with the slicing knives and driven by said motor for reciprocating the knives, an electric circuit for the motor, a switch in the circuit, manually operable means for closing the switch, a plate movably mounted on said table having one end portion projecting upwardly through the table, the other end portion extending below the table, an arm extending from the manually operable switch closing means, means on said arm and on the last mentioned portion of said plate, said means on the arm engaging thereagainst to prevent switch closing until the plate has been moved away from normal position.

12. A bread slicing machine comprising, bread slicing knives normally stationary, means for actuating said knives, a plurality of manual means requiring simultaneous use of both hands of an operator in positions remote from said knives to start movement of said actuating means, one of said manual means being inoperative until the other of said means has been actuated and stop means to prevent actuation of said starting means, said stop means being moved to inoperative position by placement of a loaf thereon.

13. A bread slicing machine comprising, bread slicing knives normally stationary, a pusher to push a loaf of bread into contact with said knives, manual means for retracting said pusher, means for actuating said knives, means to start and stop said actuating means manually operated from a position remote from said knives and separate from said pusher, means actuated by said pusher in other than retracted position to stop said actuating means, and stop means to prevent actuation of said starting means, said stop means being moved to inoperative position by placement of a loaf thereon.

HOWARD B. TUTHILL.
HARRY F. CALDWELL.